United States Patent [19]

Futagawa et al.

[11] Patent Number: 5,687,033
[45] Date of Patent: Nov. 11, 1997

[54] SUPPORTING MECHANISM FOR ALLOWING AN OBJECT TO MAKE A PSEUDO-TRANSLATIONAL MOTION

[75] Inventors: Masayasu Futagawa, Nabari; Renzaburou Miki, Tenri, both of Japan

[73] Assignee: Sharp Kabushiki Kaisha, Osaka, Japan

[21] Appl. No.: 579,300

[22] Filed: Dec. 27, 1995

[30] Foreign Application Priority Data

Dec. 28, 1994 [JP] Japan .................................. 6-328451

[51] Int. Cl.$^6$ .................................................. G02B 7/02
[52] U.S. Cl. .......................... 359/824; 359/814; 359/819; 359/811; 369/44.15; 369/244
[58] Field of Search ............................ 359/814, 813, 359/824, 811, 823, 819; 369/44.15, 44.16, 244, 247

[56] References Cited

U.S. PATENT DOCUMENTS

| 4,720,088 | 1/1988 | Tamura | 359/823 |
|---|---|---|---|
| 4,913,527 | 4/1990 | Jessop | 359/823 |
| 5,130,854 | 7/1992 | Suzuki | 359/823 |
| 5,220,459 | 6/1993 | Ichikawa et al. | 359/811 |
| 5,453,881 | 9/1995 | Suzuki | 359/824 |

FOREIGN PATENT DOCUMENTS

| 57-85567 | 5/1982 | Japan . |
|---|---|---|
| 432035 | 2/1992 | Japan . |
| 5325222 | 12/1993 | Japan . |

*Primary Examiner*—Loha Ben

[57] ABSTRACT

An objective-lens driving device has a supporting mechanism for supporting a magnetic circuit so as to allow it to freely make a pseudo-translational motion in the focusing direction. The supporting mechanism is provided with two hinges that are placed in such directions as to make a right angle with each other. The hinges are fixed onto the same plane of a base member at respective ends thereof that are farther from each other, and they are also fixed to the magnetic circuit at respective ends thereof that are closer to each other. Moreover, each hinge has flexible sections that are formed in at least two locations of each hinge with predetermined intervals from the magnetic circuit so that they are in parallel with each other. These flexible sections are formed in such a manner that they make a right angle with each other on the two hinges. This supporting mechanism, which has the hinges that are placed on the same plane, makes it possible to reduce a space taken in the focusing direction to a great degree. Therefore, it becomes possible to make the objective-lens driving device more compact and thinner. Furthermore, it is possible to easily manufacture the objective-lens driving device.

24 Claims, 10 Drawing Sheets

SUPPORTING MECHANISM FOR ALLOWING AN OBJECT TO MAKE A PSEUDO-TRANSLATIONAL MOTION

FIELD OF THE INVENTION

The present invention relates to a supporting mechanism that allows a light, small object, such as an objective lens in an optical pickup, to make a pseudo-translational motion within a limited range in terms of direction and amount of movement. The supporting mechanism also supports the object with a sufficient rigidity so as not to allow it to move or rotate in other directions.

BACKGROUND OF THE INVENTION

Figure 6:
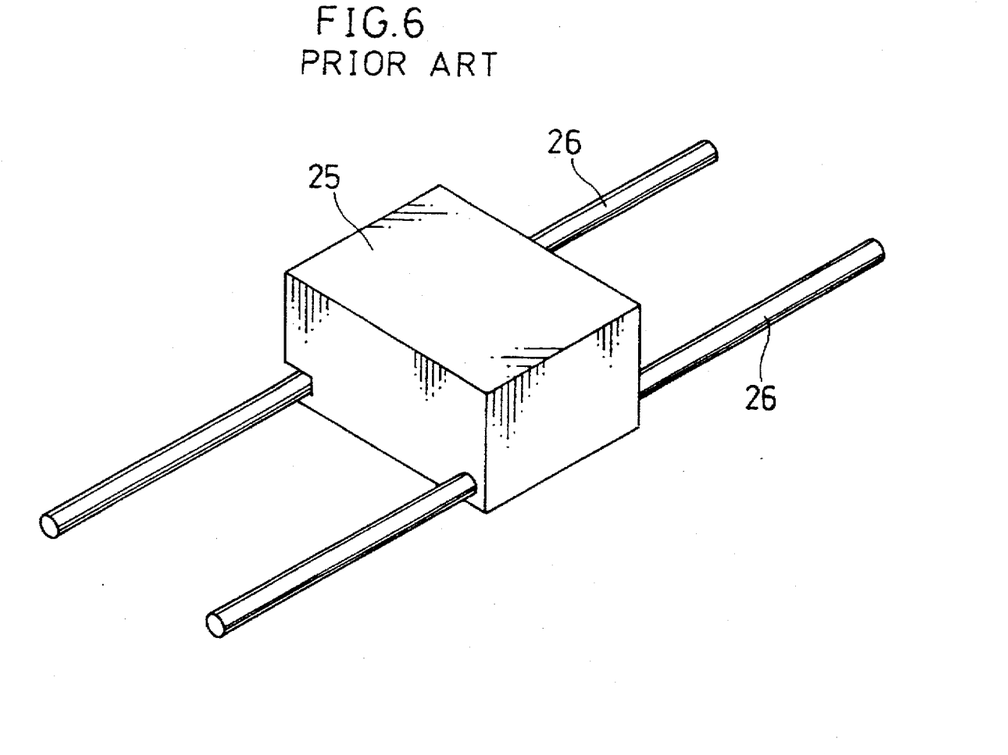
FIG. 6 is a perspective view showing a structure of a conventional supporting mechanism wherein guide shafts are used.

In order to support such an object and allow it to make a pseudo-translational motion, a mechanism having guide shafts 26 is used, for example, as shown in FIG. 6. In the case of a supported object 25 that is lighter and smaller, and that requires comparatively less movements, mechanisms using parallel plate springs and a parallel link mechanism are often adopted, and these mechanisms are manufactured more economically, compared with the mechanism using the guide shafts.

Figure 7:
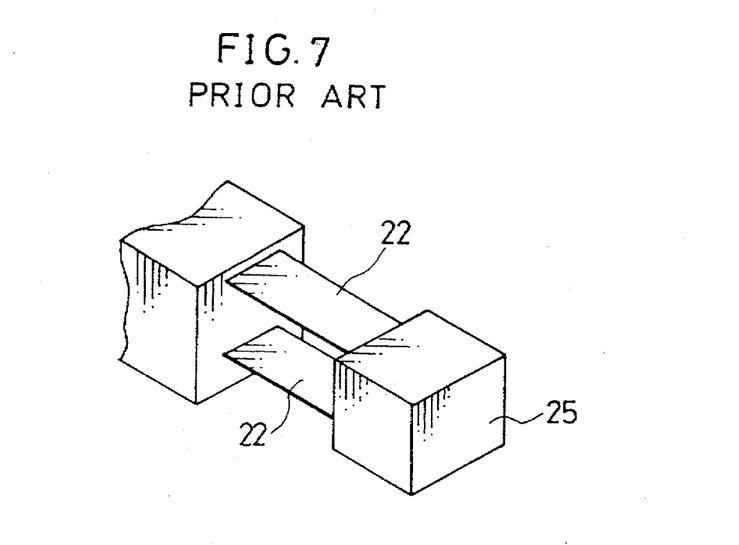
FIG. 7 is a perspective view showing a structure of a conventional supporting mechanism wherein parallel plate springs are used.
Figure 8:
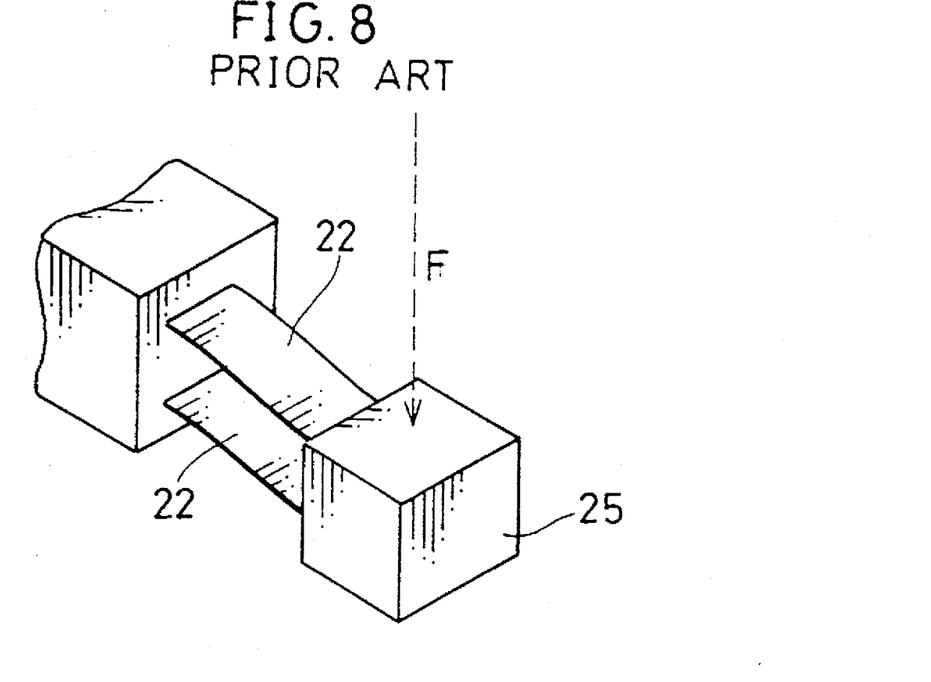
FIG. 8 is a perspective view showing a state wherein the supporting mechanism of FIG. 7 moves the supported object by using elastic deformation of the parallel plate springs.

As illustrated in FIG. 7, the parallel plate springs are constituted of two plate springs 22 that are placed in parallel with each other. In this supporting mechanism, when a driving force F is applied to the supported object 25 downward, as shown in FIG. 8, the two plate springs 22 are subjected to elastic deformation so that the supported object 25 is allowed to make a pseudo-translational motion downward.

Figure 9:
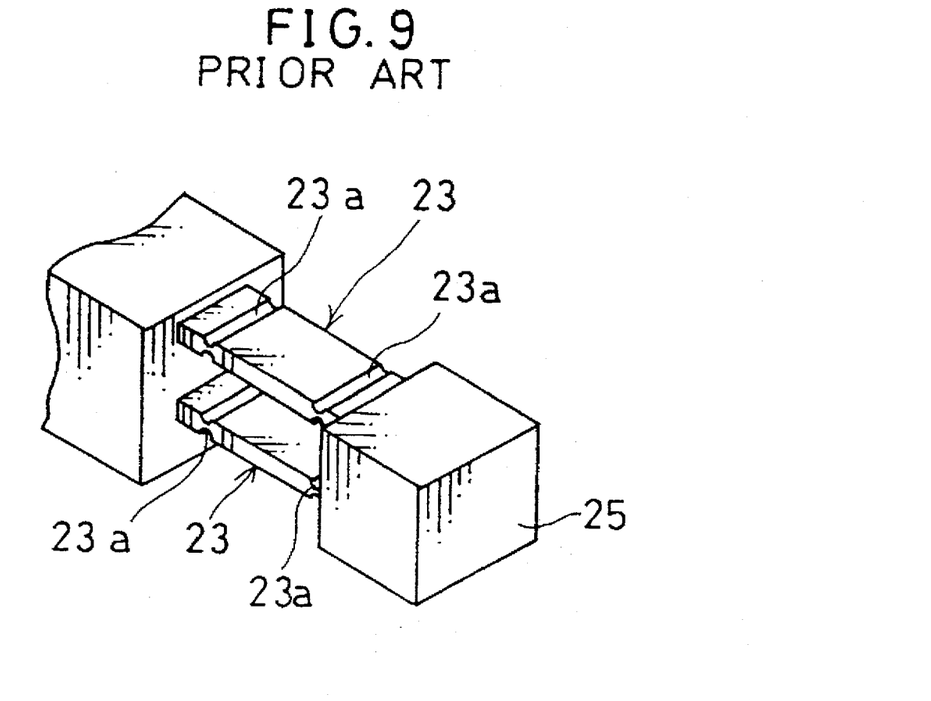
FIG. 9 is a perspective view showing a structure of a conventional supporting mechanism wherein a parallel link mechanism is used.
Figure 10:
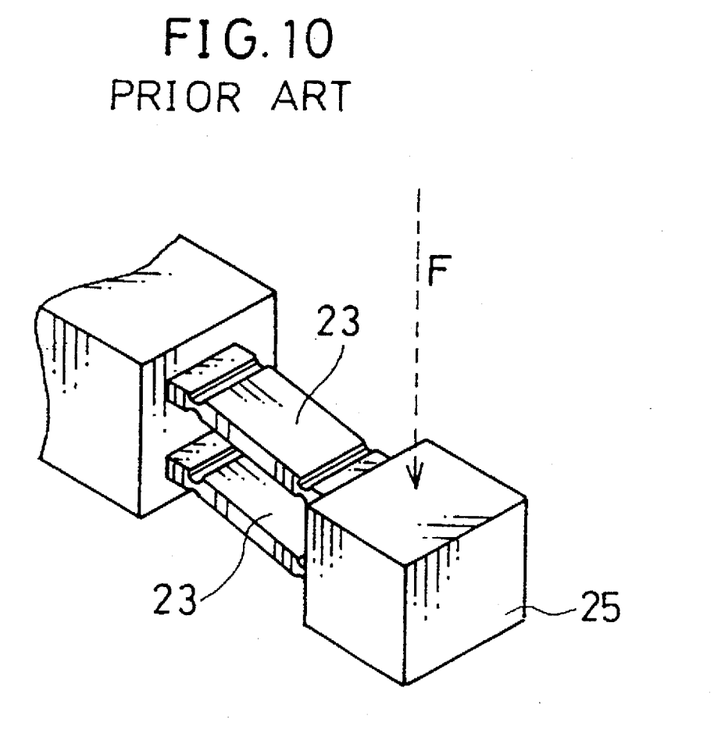
FIG. 10 is a perspective view showing a state wherein the supporting mechanism of FIG. 9 moves the supported object by using elastic deformation of the hinges.

As illustrated in FIG. 9, the parallel link mechanism is constituted of hinges 23 that are made of resin and that are placed in parallel with each other. The hinge 23, which is molded from resin molding material, has narrowed portions 23a that are formed in a partially thinner fashion. These narrowed portions 23a are elastically deformed so that a hinge effect is obtained. Therefore, when a driving force F is applied to the supported object 25 downward as shown in FIG. 10, the hinges 23, which are placed in parallel with each other, are subjected to elastic deformation so that the supported object 25 is allowed to make a pseudo-translational motion downward.

Figure 11:
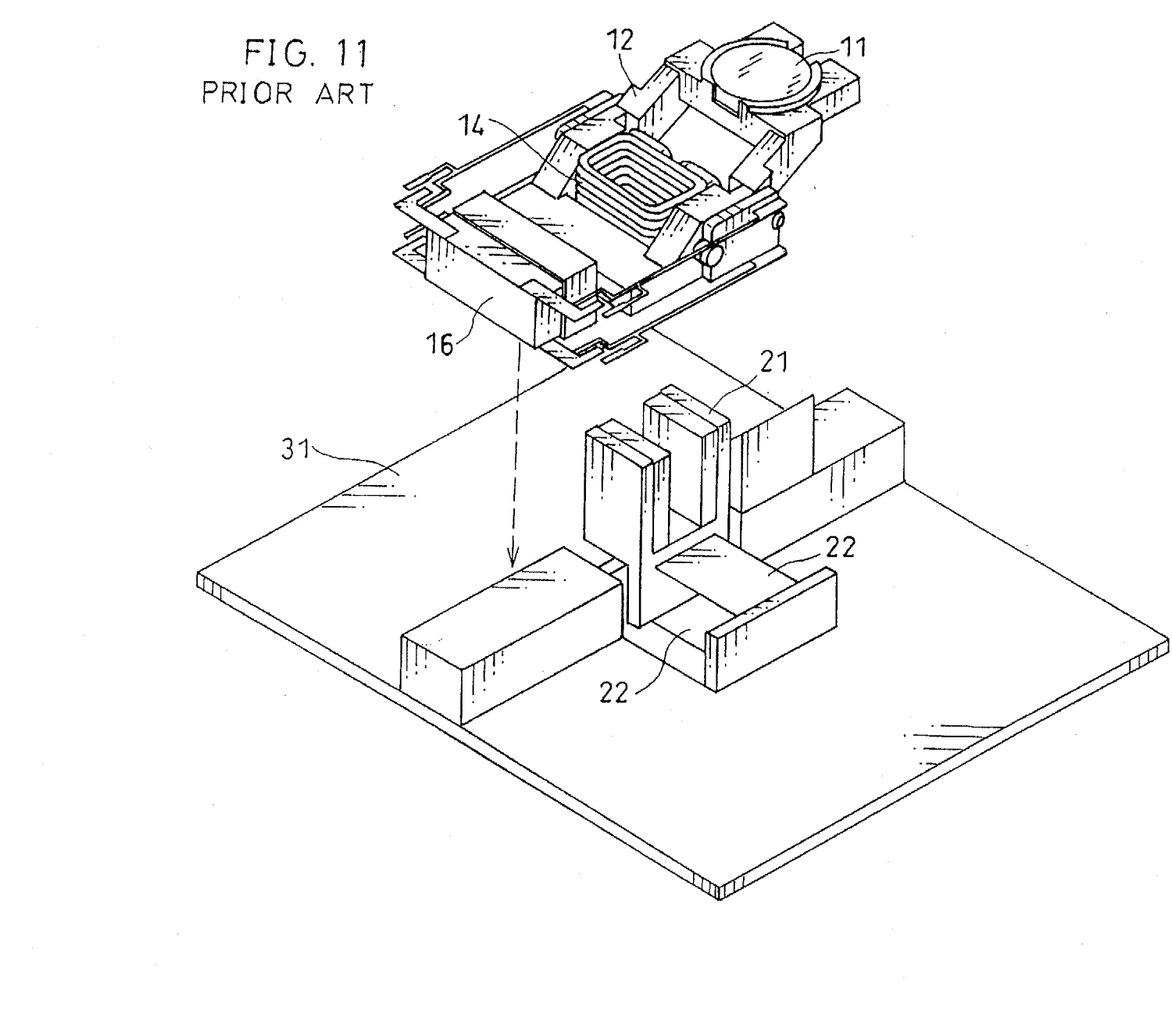
FIG. 11 is a perspective view showing a structure of a conventional objective-lens driving device wherein parallel plate springs are used.

FIG. 11 shows one example in which the above-mentioned supporting mechanism is applied to an objective-lens driving device.

In this objective-lens driving device, a magnetic circuit 21 is supported by the two plate springs 22 that are placed in parallel with each other, so that visco-elasticity is provided in the focussing direction with respect to a base 31. When a driving force in the focussing direction, which is generated by a focusing-use actuator that is constituted of a focussing coil 14 and the magnetic circuit 21, is applied to a lens holder 12 that holds an objective lens 11, a driving force in the reverse direction is exerted on the magnetic circuit 21. Thus, the plate springs 22, which have been elastically deformed, allow the magnetic circuit 21 to move in a direction in reversal to the direction of the lens holder 12. This operation makes it possible to cancel vibration in the focussing direction that occurs in the objective-lens driving device.

Figure 12:
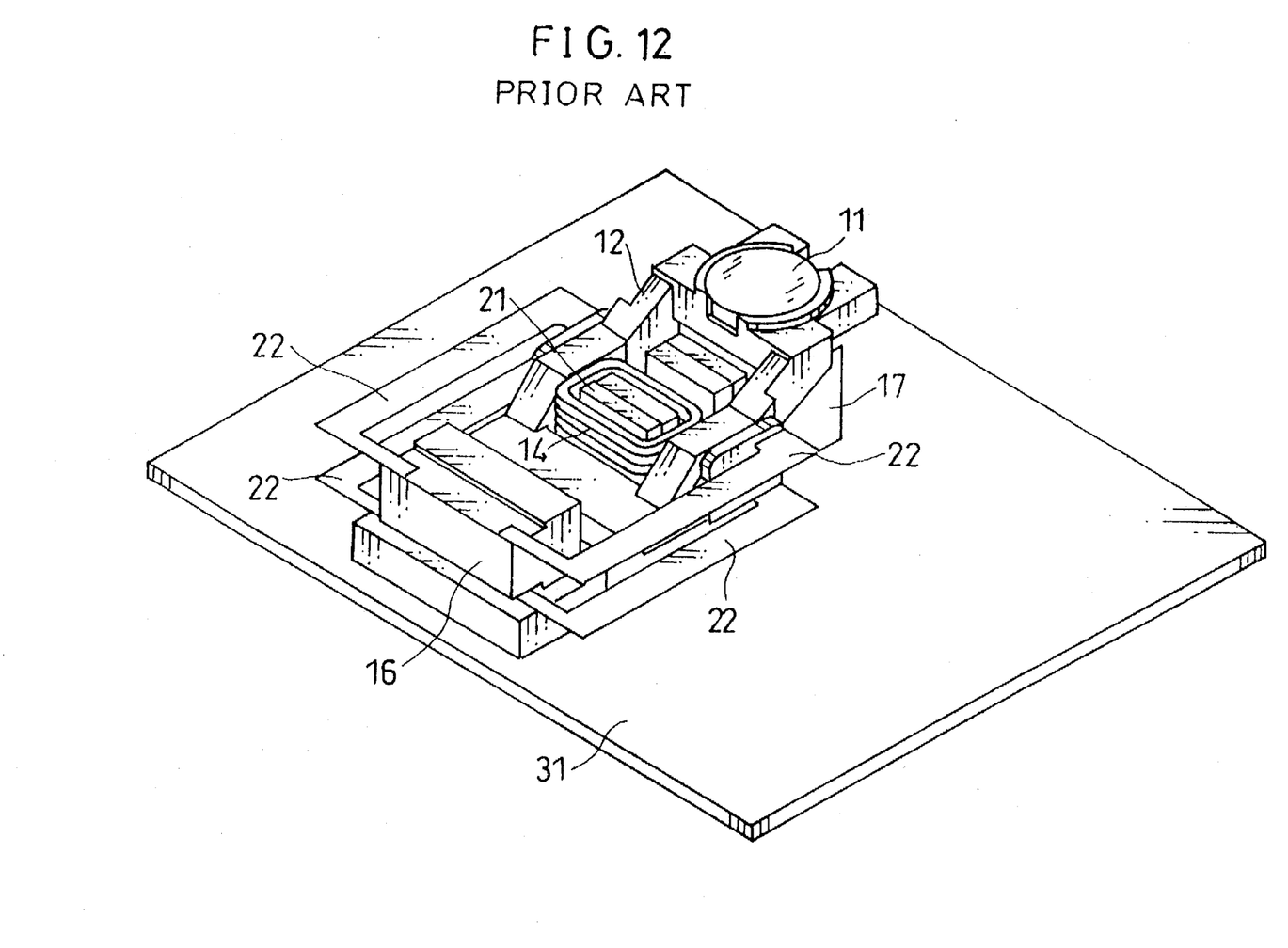
FIG. 12 is a perspective view showing another structure of a conventional objective-lens driving device wherein parallel plate springs are used.

Moreover, in the objective-lens driving device as shown in FIG. 12, the magnetic circuit 21 is secured onto the base 31, and the lens holder 12 is supported by the plate springs 22 onto a spring holder 16 that is secured onto the base 31.

With this structure, the objective lens 11 is allowed to make a translational motion when it is shifted in the focussing direction.

However, in conventional supporting mechanisms using the parallel plate springs or the parallel link mechanism, supporting members, such as springs and hinges, have to be placed in parallel with one another with certain gaps in the direction of movement (the focussing direction) with respect to the supported object 25 (the magnetic circuit 21 or the lens holder 12), in order to obtain the translational motion. Consequently, one of the problems is that the structure tends to become bulky in the direction of movement.

Moreover, the supporting members need to have particular shapes that are required to be fixed to the base 31 and the magnetic circuit 21 (the lens holder 12), that is, particular shapes that are suitable for positioning and fixing purposes. For this reason, the supporting members have to be molded into complicated shapes. This makes it difficult to produce the supporting members.

Figure 13:
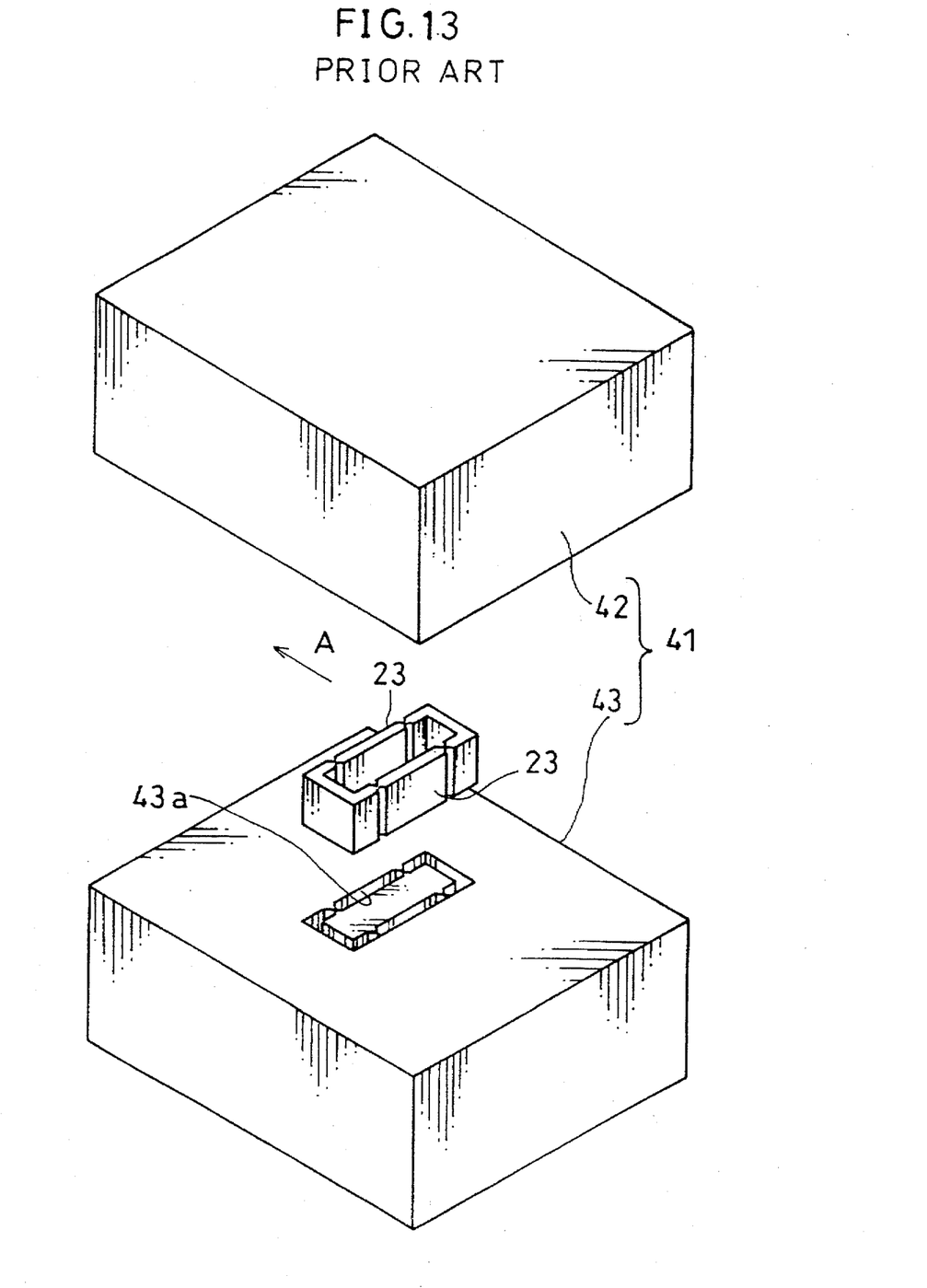
FIG. 13 is a perspective view showing a state wherein a parallel link mechanism is being taken out of an opened metal mold when the parallel link mechanism is manufactured by using the metal mold.

As illustrated in FIG. 13, the resin molded products having such a hinge structure are manufactured by using a metal mold 41 of a two-piece structure which is the most simple (low cost) and which consists of an upper mold 42 and a lower mold 43. The manufacturing operation of the hinges 23 includes a process for pouring molten resin into a mold section 43a provided in the lower mold 43, a process for hardening the resin, and a process for opening the molds and taking out the molded products (hinges 23). When the hinges 23 are taken out of the metal mold 41, the metal mold 41 has to be opened in a direction perpendicular to the translational direction (indicated by arrow A) of the hinges 23.

The metal mold 41 having such a structure needs to have a shape that is allowed to open after the molded products have hardened. Therefore, for example, in the case when molded products having holes inside or having recessed portions on their surface are manufactured, it is necessary to use metal molds that have more complicated structures so that those portions do not get stuck in the metal molds.

Here, in order to lower the rigidity of the narrowed portions 23a so as to allow the hinges 23 to deform easily and lower the resonance frequency, one of the simplest methods is, for example, to provide holes in the narrowed portions 23a. Consequently, the metal mold 41 needs to have metal portions for forming the holes.

When the hinges 23 are molded by using such a metal mold 41, the molded products get stuck in the above-mentioned metal portions after the resin has hardened since the opening and closing directions of the metal mold 41 are orthogonal to the axial direction of the holes, that is, the translational direction. This results in a problem in which the metal mold 41 can not be opened. The same problem arises when the hinges 23 have the above-mentioned shapes for positioning and fixing purposes.

Therefore, in order to solve these problems, it is necessary to adopt, for example, a structure wherein when the metal mold 41 is opened, the metal portions can be slid in a manner as to prevent the molded products from getting stuck therein.

SUMMARY OF THE INVENTION

It is an objective of the present invention to provide a supporting mechanism that is thinner in thickness and that has a simple structure.

In order to achieve the above-mentioned objective, a mechanism of the present invention, which supports an object so as to allow it to freely make a pseudo-translational motion, is provided with:

a base member for forming a base that supports the object; and a support section for supporting the object so that the object is allowed to freely make a pseudo-translational motion in a direction perpendicular to the base member, the support section being constituted of two plate members that are placed in such directions as to make a right angle with each other, the two plate members being fixed onto the same plane of the base member at respective ends thereof that are farther from each other, the object being fixed to respective ends thereof that are closer to each other.

With this arrangement, since the plate members are placed on the same plane, it is possible to reduce to a great degree the space that is occupied by the support section within the base member in the perpendicular direction. Therefore, it becomes possible to make the supporting mechanism more compact and thinner. Moreover, the supporting mechanism can be easily manufactured.

In order to achieve the above-mentioned objective, an objective-lens driving device of the present invention is provided with:

a lens holder to which a focusing-direction driving coil for driving the objective lens in a focusing direction is fixed, the lens holder supporting the objective lens;

a magnetic circuit for generating a driving force that drives the lens holder by interaction with an electromagnetic force that is generated by the focusing-direction driving coil;

a base member for forming a base that supports the lens holder and the magnetic circuit;

a magnetic-circuit supporting section for supporting the magnetic circuit so that the magnetic circuit is allowed to freely make a pseudo-translational motion in the focusing direction, the magnetic-circuit support section being constituted of two plate members that are placed in such directions as to make a right angle with each other, the two plate members being fixed onto the same plane of the base member at respective ends thereof that are farther from each other, the magnetic circuit being fixed to respective ends thereof that are closer to each other; and a lens-holder supporting section for supporting the lens holder above the base member so that one part of the magnetic circuit is placed inside the focusing-direction driving coil and the lens holder is allowed to freely move in the focusing direction.

With this arrangement, since the plate members are placed on the same plane, it is possible to reduce to a great degree the space that is occupied by the magnetic-circuit support section in the focusing direction. Therefore, it becomes possible to make the objective-lens driving device more compact and thinner. Moreover, the objective-lens driving device can be easily manufactured.

In order to achieve the above-mentioned objective, another objective-lens driving device of the present invention is provided with:

a lens holder to which a focusing-direction driving coil for driving the objective lens in a focusing direction is fixed, the lens holder supporting the objective lens;

a base member for forming a base that supports the lens holder;

a magnetic circuit for generating a driving force that drives the lens holder by interaction with an electromagnetic force that is generated by a focusing-direction driving coil, the magnetic circuit being fixed to the base member; and a lens-holder supporting section for supporting the lens holder above the base member so that one part of the magnetic circuit is placed inside the focusing-direction driving coil and the lens holder is allowed to freely make a translational motion in the focusing direction, the lens-holder supporting section being constituted of two plate members that are placed in such directions as to make a right angle with each other, the two plate members being fixed onto the same plane of the base member at respective ends thereof that are farther from each other, the lens holder being fixed to respective ends thereof that are closer to each other.

With this arrangement, since the plate members are placed on the same plane, it is possible to reduce to a great degree the space that is occupied by the lens-holder support section in the focusing direction. Therefore, it becomes possible to make the objective-lens driving device more compact and thinner. Moreover, the objective-lens driving device can be easily manufactured.

In the above-mentioned supporting mechanism or the two objective-lens driving devices, it is preferable to provide flexible portions that deform elastically, in a manner as described below: The flexible portions are formed in at least two positions on the single plate member with predetermined intervals from the object (the magnetic circuit or the lens holder) so that they are in parallel with each other on the single plate member and are also orthogonal to each other on the two plate members.

In this arrangement, when a force is applied to the object (the magnetic member or the lens holder) in a direction perpendicular to the upper surface of the base member (in the focusing direction), two forces are exerted on the object: one force that rotates the object around the flexible portions and the other force that allows the object to make a translational motion in a direction except the direction perpendicular to the upper surface of the base member. However, since the plate members are placed so that the respective flexible portions make a right angle with each other on the same plane, it is possible to restrict the other forces that are exerted in directions except the desired direction to an acceptable degree. Therefore, since the plate members are deformed only in the direction perpendicular to the upper surface of the base member, the object is allowed to make a translational motion in the same direction.

Further, with an arrangement wherein the flexible portions are formed in at least two positions on the single plate member so that they are in parallel with each other on the single plate member, it is possible to allow the object to make a pseudo-translational motion effectively.

In the above-mentioned supporting mechanism or both of the objective-lens driving devices, the plate members are preferably molded as an integral part by using a resin material, and have narrowed portions as the flexible portions that are provided as portions thinner than the other portions.

In this arrangement, even in the case of using a metal mold with two divided parts in the molding process, it is possible to make the opening and closing directions of the metal mold coincident with the deforming direction of the supporting members (translational direction) because the supporting members are formed in a plane fashion. Therefore, even in the case when holes, etc. are provided in the supporting members in the translational direction, it is not necessary to provide a complicated structure in the metal mold in order to easily take out the supporting members, that is, the molded products, from the metal mold.

For a fuller understanding of the nature and advantages of the invention, reference should be made to the ensuing detailed description taken in conjunction with the accompanying drawings.

DESCRIPTION OF THE EMBODIMENTS

Referring to FIGS. 1 through 5, the following description will discuss one embodiment wherein a supporting mechanism for providing a pseudo-translational motion of the present invention is applied to an objective-lens driving device. Here, those components that have the same functions and that are described in the conventional objective-lens driving device are indicated by the same reference numerals.

Figure 1:
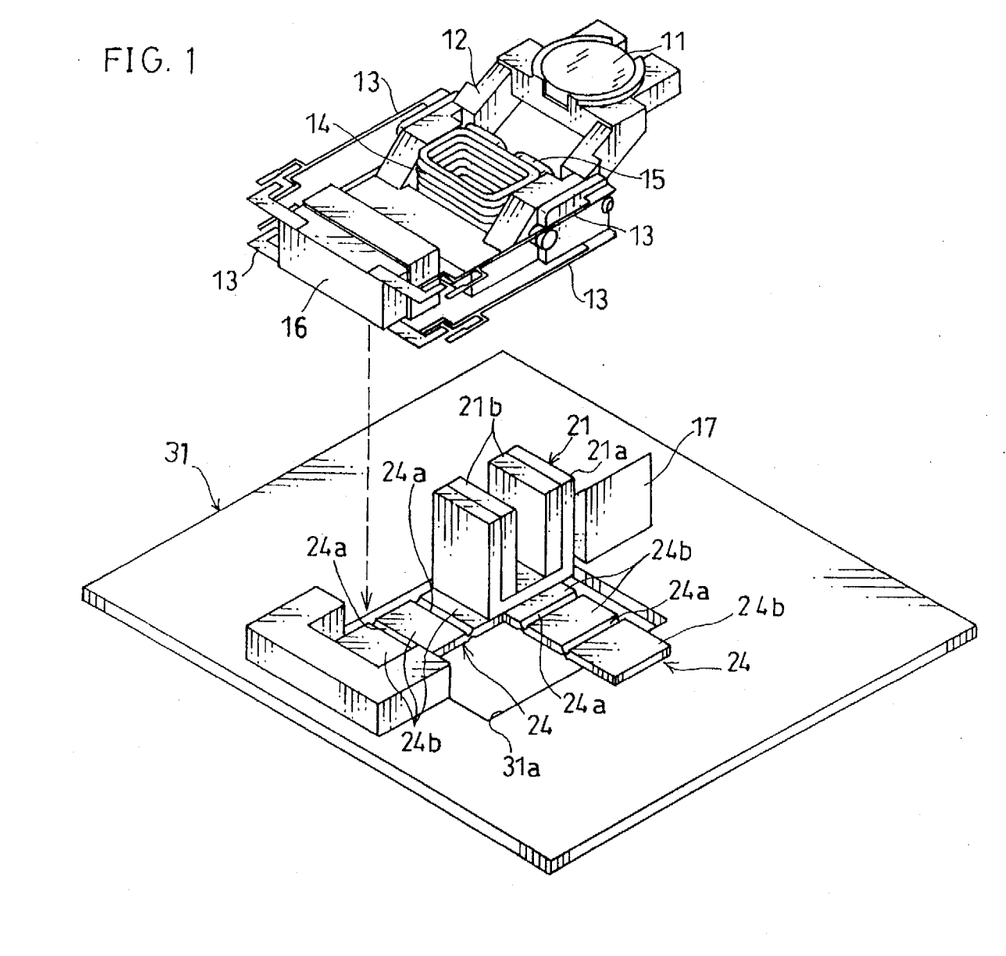
FIG. 1 is a perspective view showing a structure of an objective-lens driving device of one embodiment of the present invention.

As illustrated in FIG. 1, the objective-lens driving device is constituted by combining a magnetic circuit 21 and a lens holder 12 to which a focusing-direction driving coil 14 (hereinafter, referred to as a focusing coil) and a tracking-direction driving coil 15 (hereinafter, referred to as a tracking coil) are fixed. An objective lens 11 is held on the lens holder 12. Onto the base 31 is fixed a 45°-mirror 17 which directs a laser light beam to the objective lens 11 and which also deflects light that has been reflected from an optical disk, not shown, and has directed by the objective lens 11.

The magnetic circuit 21 is constituted of a U-shaped yoke 21a and magnets 21b, and is placed above an opening section 31a that is formed in a base 31. The magnets 21b are fixed to the upright portions of the yoke 21a in a face-to-face manner with each other. Two sheets of plate hinges 24, which constitute a magnetic circuit supporting section, are secured on the periphery of the opening section 31a of the base 31 so that they make a right angle with each other. The magnetic circuit 21 is supported by the base 31 with certain elasticity that is exerted by the hinges 24. Thus, the magnetic circuit 21 is allowed to make movements in a manner so as to stick out from the lower surface side of the base 31 through the opening section 31a.

The lens holder 12 is disposed on the magnetic circuit 21 so that one of the magnets 21b, which forms one portion of the magnetic circuit 21, is located in a space inside the focusing coil 14. Further, the lens holder 12 is fixed to a spring holder 16 by using four wire-shaped springs 13 so that it is allowed to freely move within predetermined ranges in the focussing direction and in the tracking direction.

Each hinge 24 is produced by molding thermo-plastic elastomer, and has narrowed portions 24a and plate portions 24b that connect to the both sides of each narrowed portion 24a. The plate portions 24b are designed so that they can freely rotate within predetermined ranges around each narrowed portion 24a that serves as a rotation axis. Here, the narrowed portions 24a are provided in at least two locations of each hinge 24, and the narrowed portions 24a have predetermined intervals from the magnetic circuit 21, and are in parallel with each other. The hinge 24 achieves its hinge function by these narrowed portions 24a that can be elastically deformed.

The hinges 24 are arranged so that the respective narrowed portions 24a make a right angle with each other, and are disposed on the same plane that is parallel to the base 31. Thus, the hinges 24 constitute a mechanism for supporting the lens holder 12. Since the hinges 24 are disposed in a plane fashion, it becomes possible to make the objective-lens driving device thinner.

The following description will discuss the operation of the hinges 24.

When a focus-driving current is supplied to the focussing coil 14, the lens holder 12 is subjected to a driving force in the focusing direction. Simultaneously, the magnetic circuit 21 is subjected to a driving force in a direction reversed to the driving force that has been applied to the lens holder 12. At this time, since the hinges 24 are arranged so that the respective narrowed portions 24a make a right angle with each other, it is possible to restrict, to an acceptable degree, rotative movements around the narrowed portions 24a that serve as rotation axes and translational movements in directions other than the focusing direction, with respect to the magnetic circuit 21. Consequently, since the magnetic circuit 21 is allowed to make a pseudo-translational motion in the focusing direction, it is possible to cancel vibration in the focussing direction that occurs in the objective-lens driving device.

Figure 2:
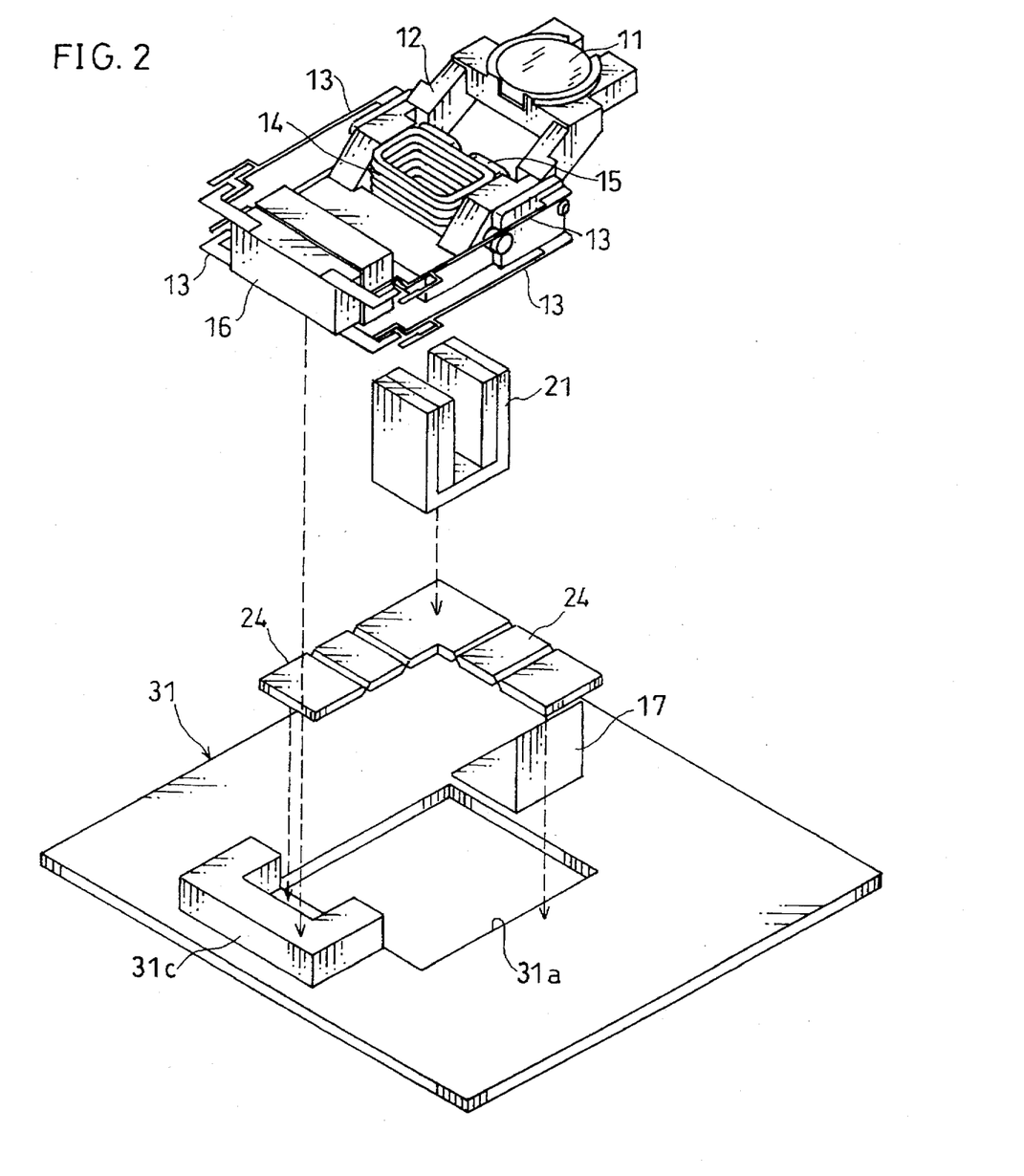
FIG. 2 is a perspective view showing a sequence of processes for assembling the above-mentioned objective-lens driving device.

Here, the following description will discuss the assembling processes of the objective-lens driving device.

As illustrated in FIG. 2, first, the hinges 24 are fixed to the base 31. The hinges 24 are molded into an integral part with an L-shape by using a metal mold with two divided parts. For this reason, the fixing process is easily carried out by fixing the ends of the hinges 24 onto the base 31 through a method, such as a bonding, welding, screw-fixing, or fitting method. At this time, the positioning of the fixing process is, for example, carried out by press-fitting a protruding member, formed on either the base 31 or the hinges 24, into a hole formed in the other of the two.

Next, the magnetic circuit 21 is secured to the upper surface of the corner section at which the hinges 24 are integrally connected. This fitting process is carried out in the same manner as the fitting process of the hinges 24 to the base 31.

Then, the lens holder 12 is secured to the base 31 by fixing the spring holder 16 to a block 31c so that one of the magnets 21b of the magnetic circuit 21 is located in a space inside the focusing coil 14.

As described above, in the present embodiment, since the hinges 24 that are molded into an integral part in a plane fashion are used, it is possible to easily produce (mass-produce) the objective-lens driving device. Further, even in the case when holes are provided in the narrowed portions 24a in order to lower the rigidity of the translational motion of the hinges 24, since the hinges 24 have such a plane structure, the direction (translational direction) of the holes is coincident with the opening and closing directions of the metal mold. Therefore, it is not necessary to provide a complicated structure in the metal mold in order to form the holes during the molding process.

Moreover, in the present embodiment, thermoplastic elastomer is used as a material for the hinge 24; therefore, the hinge 24 can be readily mas-produced at low costs by using the resin-molding technique. Moreover, in the present embodiment, the hinge function of the hinges 24 is obtained by molding thermoplastic elastomer so as to provide the narrowed portions 24 having a partially thin structure. However, it is possible to obtain a similar hinge function by combination between an elastic material and a reinforcing member, or combination between an elastic material and a metal member.

Figure 3:
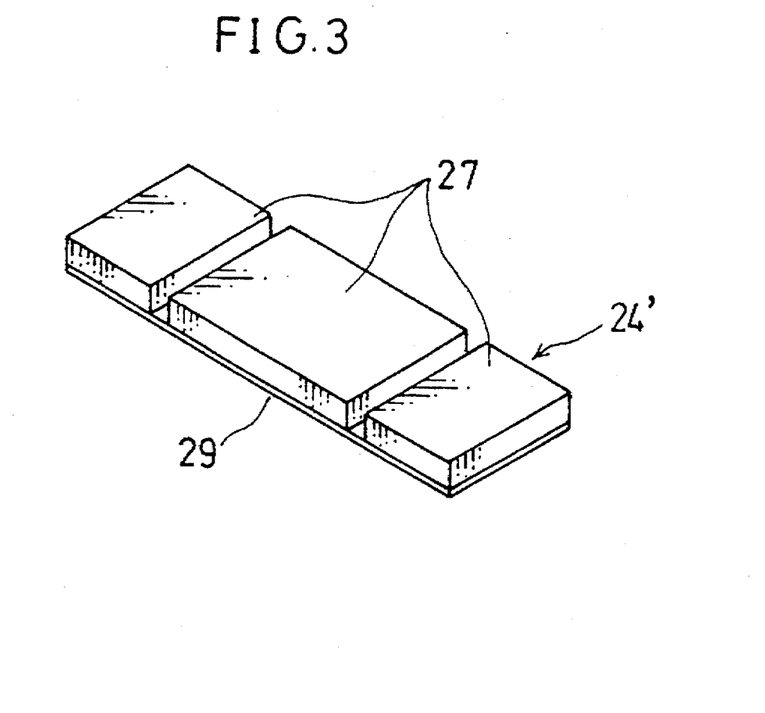
FIG. 3 is a perspective view showing a structure of another hinge that is used in the above-mentioned objective-lens driving device.

For example, as illustrated in FIG. 3, a hinge 24' is constituted by combining a film section 29 made of a thin elastic material and plate sections 27 made of a plate-shaped reinforcing member into one integral part. The hinge 24' obtains a hinge function similar to that of the hinge 24 by placing the plate sections 27 with appropriate intervals. Compared with the hinge 24, this structure achieves a lower resonance frequency.

Figure 4:
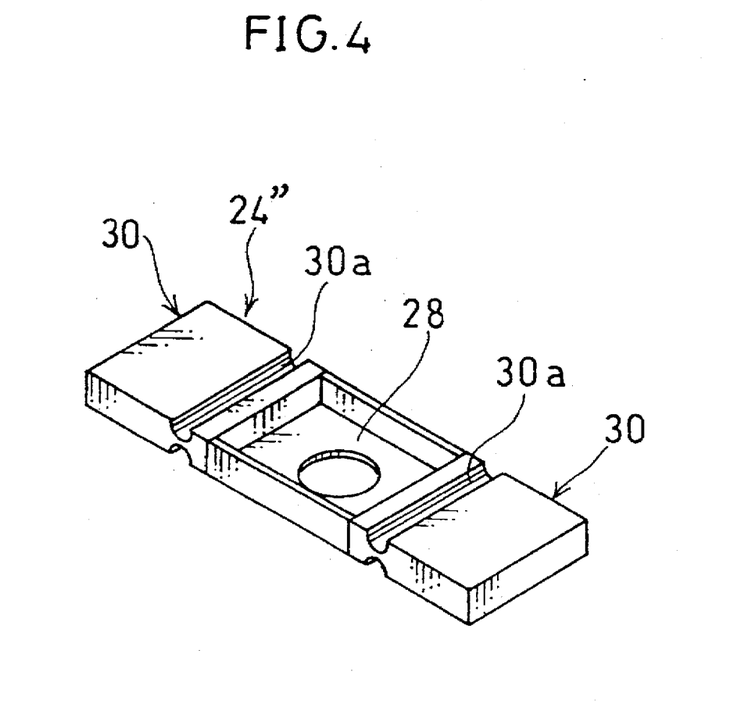
FIG. 4 is a perspective view showing a structure of still another hinge that is used in the above-mentioned objective-lens driving device.

Moreover, as illustrated in FIG. 4, a hinge 24" is constituted by combining, into one integral part, a main portion 28 made of a metal material and fixing portions 30 that are provided in both sides of the main portion 28. The main portion 28 is hollowed out at the center to such an extent as to still maintain sufficient rigidity in order to achieve light weight. One of the fixing portions 30 is secured to the magnetic circuit 21, and the other is secured to the base 31. Furthermore, the fixing portion 30, which is made of an elastic material (for example, the same material as the hinge 24), is provided with a narrowed portion 30a that has a partially thin structure.

In the above-mentioned hinge 24", in the case where the main portion 28 is designed to have the same rigidity as the intermediate plate portion 24b in the hinge 24, it is possible to make the main portion 28 more compact (thinner) than the intermediate plate portion 24b. Further, in the case where the main portion 28 is designed to have the same dimension (thinness) as the intermediate plate portion 24b in the hinge 24, it is possible to form the main portion 28 with higher rigidity than that of the intermediate plate portion 24b.

Figure 5:
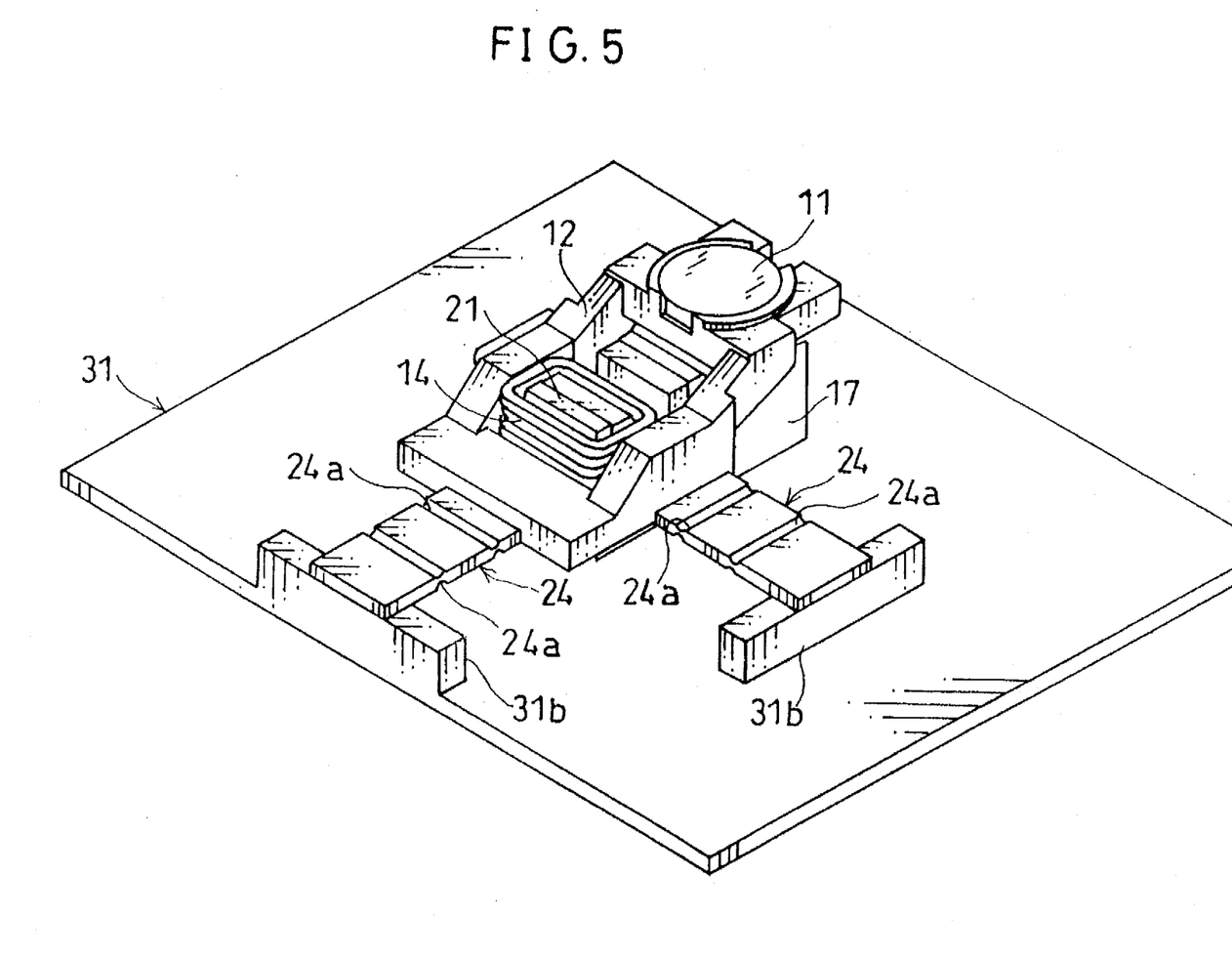
FIG. 5 is a perspective view showing another structure of an objective-lens driving device of one embodiment of the present invention.

Next, the following description will discuss another structure of the objective-lens driving device of the present embodiment.

As illustrated in FIG. 5, the present objective-lens driving device uses a supporting mechanism for the lens holder 12, wherein the hinges 24 are adopted.

The lens holder 12 is supported by the hinges 24 that provide certain elasticity, and the hinges 24 are secured to blocks 31b that are provided on the upper surface of the base 31. Here, the narrowed portions 24a are provided in at least two locations of each hinge 24, and the narrowed portions 24a have predetermined intervals from the lens holder 12, and are in parallel with each other. Moreover, in the present objective-lens driving device, the magnetic circuit 21 is secured onto the base 31.

In the objective-lens driving device having the above-mentioned structure, when a focus-driving current is supplied to the focussing coil 14, the lens holder 12 is subjected to a driving force in the focusing direction. At this time, since the hinges 24 are arranged so that the respective narrowed portions 24a make a right angle with each other, it is possible to restrict, to an acceptable degree, rotative movements around the narrowed portions 24a that serve as rotation axes and translational movements in directions other than the focusing direction, with respect to the lens holder 12. Consequently, the lens holder 12 is allowed to make a pseudo-translational motion in the focusing direction.

Different from a conventional objective-lens driving device using parallel plate springs, the above-mentioned objective-lens driving device does not need the structure wherein the plate springs are disposed in the thickness direction of the device with predetermined intervals (see FIG. 7). Therefore, the objective-lens driving device can be readily manufactured.

Additionally, in the objective-lens driving device of FIG. 5 also, the hinge 24' or the hinge 24" may of course be used in place of the hinge 24.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A mechanism for supporting an object so as to allow the object to freely make a pseudo-translational motion, comprising:

a base member for forming a base that supports the object; and a support section for supporting the object so that the object is allowed to freely make a pseudo-translational motion in a direction perpendicular to the base member, the support section being constituted of two plate members that are placed in such directions as to make a right angle with each other, each plate member having a first end and a second end, the two plate members being fixed onto the same plane of the base member at the respective first ends that are farther from each other, the object being fixed to the respective second ends that are closer to each other.

2. The supporting mechanism as defined in claim 1, wherein each plate member having flexible sections that deform elastically, the flexible sections being formed in at least two locations of each plate member with predetermined intervals from the object so that they are in parallel with each other on the single plate member and are also orthogonal to each other on the two plate members.

3. The supporting mechanism as defined in claim 2, wherein each plate member is molded into one integral part by using resin as a material, with narrowed portions that are formed in a partially thinner fashion so as to serve as the flexible sections.

4. The supporting mechanism as defined in claim 3, wherein the resin is elastomer.

5. The supporting mechanism as defined in claim 4, wherein the two plate members are formed into an integral part so that they are connected to each other at the respective second ends that are closer to each other.

6. The supporting mechanism as defined in claim 2, wherein the plate member is formed by combining a film section made of a thin elastic material and plate sections made of plate-shaped reinforcing members into one integral part, and the flexible section is formed by disposing the plate sections with predetermined intervals.

7. The supporting mechanism as defined in claim 2, wherein the plate member is formed by combining, into one integral part, a main portion made of a metal material and fixing portions that are provided in both sides of the main portion and that are fixed to the base member and the object, the fixing portions being made of a resilient material, each fixing portion having a narrowed section that is formed in a partially thinner fashion so as to serve as the flexible section.

8. The supporting mechanism as defined in claim 7, wherein the resilient material is elastomer.

9. An objective-lens driving device comprising:
a lens holder to which a focusing-direction driving coil for driving the objective lens in a focusing direction is fixed, the lens holder supporting the objective lens;
a magnetic circuit for generating a driving force that drives the lens holder by interaction with an electromagnetic force that is generated by the focusing-direction driving coil;
a base member for forming a base that supports the lens holder and the magnetic circuit;
a magnetic-circuit supporting section for supporting the magnetic circuit so that the magnetic circuit is allowed to freely make a pseudo-translational motion in the focusing direction, the magnetic-circuit support section being constituted of two plate members that are placed in such directions as to make a right angle with each other, each plate member having a first end and a second end, the two plate members being fixed onto the same plane of the base member at the respective first ends that are farther from each other, the magnetic circuit being fixed to the respective second ends that are closer to each other; and
a lens-holder supporting mechanism for supporting the lens holder above the base member so that one part of the magnetic circuit is placed inside the focusing-direction driving coil and the lens holder is allowed to freely move in the focusing direction.

10. The objective-lens driving device as defined in claim 9, wherein each plate member having flexible sections that deform elastically, the flexible sections being formed in at least two locations of each plate member with predetermined intervals from the magnetic circuit so that they are in parallel with each other on the single plate member and are also orthogonal to each other on the two plate members.

11. The objective-lens driving device as defined in claim 10, wherein each plate member is molded into one integral part by using resin as a material, with narrowed portions that are formed in a partially thinner fashion so as to serve as the flexible sections.

12. The objective-lens driving device as defined in claim 11, wherein the resin is elastomer.

13. The objective-lens driving device as defined in claim 12, wherein the two plate members are formed into an integral part so that they are connected to each other at the respective second ends that are closer to each other.

14. The objective-lens driving device as defined in claim 10, wherein the plate member is formed by combining, into one integral part, a main portion made of a metal material and fixing portions that are provided in both sides of the main portion and that are fixed to the base member and the magnetic circuit, the fixing portions being made of a resilient material, each fixing portion having a narrowed section that is formed in a partially thinner fashion so as to serve as the flexible section.

15. The supporting mechanism as defined in claim 14, wherein the resilient material is elastomer.

16. The objective-lens driving device as defined in claim 10, wherein the plate member is formed by combining a film section made of a thin elastic material and plate sections made of plate-shaped reinforcing members into one integral part, and the flexible section is formed by disposing the plate sections on the film section with predetermined intervals.

17. An objective-lens driving device comprising:
a lens holder to which a focusing-direction driving coil for driving the objective lens in a focusing direction is fixed, the lens holder supporting the objective lens;
a base member for forming a base that supports the lens holder;
a magnetic circuit for generating a driving force that drives the lens holder by interaction with an electromagnetic force that is generated by a focusing-direction driving coil, the magnetic circuit being fixed to the base member;
a lens-holder supporting section for supporting the lens holder above the base member so that one part of the magnetic circuit is placed inside the focusing-direction driving coil and the lens holder is allowed to freely make a translational motion in the focusing direction, the lens-holder supporting section being constituted of two plate members that are placed in such directions as to make a right angle with each other, each plate member having a first end and a second end, the two plate members being fixed onto the same plane of the base member at the respective first ends that are farther from each other, the lens holder being fixed to the respective second ends that are closer to each other.

18. The objective-lens driving device as defined in claim 17, wherein each plate member having flexible sections that deform elastically, the flexible sections being formed in at least two locations of each plate member with predetermined intervals from the lens holder so that they are in parallel with each other on the single plate member and are also orthogonal to each other on the two plate members.

19. The objective-lens driving device as defined in claim 18, wherein each plate member is molded into one integral part by using resin as a material, with narrowed portions that are formed in a partially thinner fashion so as to serve as the flexible sections.

20. The objective-lens driving device as defined in claim 19, wherein the resin is elastomer.

21. The objective-lens driving device as defined in claim 20, wherein the two plate members are formed into an integral part so that they are connected to each other at the respective second ends that are closer to each other.

22. The objective-lens driving device as defined in claim 19, wherein the plate member is formed by combining, into one integral part, a main portion made of a metal material and fixing portions that are provided in both sides of the main portion and that are fixed to the base member and the lens holder, the fixing portions being made of a resilient material, each fixing portion having a narrowed section that is formed in a partially thinner fashion so as to serve as the flexible section.

23. The supporting mechanism as defined in claim 22, wherein the resilient material is elastomer.

24. The objective-lens driving device as defined in claim 18, wherein the plate member is formed by combining a film section made of a thin elastic material and plate sections made of plate-shaped reinforcing members into one integral part, and the flexible section is formed by disposing the plate sections on the film section with predetermined intervals.

* * * * *